(12) United States Patent
Hardman et al.

(10) Patent No.: US 7,392,268 B2
(45) Date of Patent: Jun. 24, 2008

(54) SYSTEMS AND METHODS FOR PARTITIONING DATA ON MULTIPLE SERVERS

(75) Inventors: Todd Hardman, Orem, UT (US); James Ivie, Lindon, UT (US); Michael Mansfield, Lindon, UT (US); Greg Parkinson, Orem, UT (US); Daren Thayne, Orem, UT (US); Mark Wolfgramm, Provo, UT (US); Michael Wolfgramm, Pleasant Grove, UT (US); Brandt Redd, Provo, UT (US)

(73) Assignee: The Generations Network, Inc., Provo, UT (US)

( * ) Notice: Subject to any disclaimer, the term of this patent is extended or adjusted under 35 U.S.C. 154(b) by 357 days.

(21) Appl. No.: 10/247,273

(22) Filed: Sep. 19, 2002

(65) Prior Publication Data

US 2004/0059757 A1    Mar. 25, 2004

(51) Int. Cl.
*G06F 17/30* (2006.01)
(52) U.S. Cl. .................. 707/204; 707/102; 711/129; 711/130; 709/223; 709/224
(58) Field of Classification Search ............... 707/9, 707/10, 104.1, 204
See application file for complete search history.

(56) References Cited

U.S. PATENT DOCUMENTS

| | | | |
|---|---|---|---|
| 6,263,331 B1 * | 7/2001 | Liu et al. ................... 707/4 |
| 6,282,670 B1 * | 8/2001 | Rezaul Islam et al. ......... 714/6 |
| 6,405,175 B1 * | 6/2002 | Ng ............................. 705/14 |
| 6,523,036 B1 * | 2/2003 | Hickman et al. .............. 707/10 |
| 6,574,578 B1 * | 6/2003 | Logan ........................ 702/122 |
| 6,597,956 B1 * | 7/2003 | Aziz et al. ..................... 700/3 |
| 6,647,396 B2 * | 11/2003 | Parnell et al. ............... 707/102 |
| 6,721,726 B1 * | 4/2004 | Swaminathan et al. ......... 707/3 |
| 6,779,016 B1 * | 8/2004 | Aziz et al. .................. 709/201 |
| 6,816,897 B2 * | 11/2004 | McGuire .................... 709/223 |
| 6,826,559 B1 * | 11/2004 | Ponte ............................ 707/3 |
| 6,904,455 B1 * | 6/2005 | Yen ............................ 709/217 |
| 6,999,967 B1 * | 2/2006 | Ghazal et al. ............... 707/101 |
| 2002/0065851 A1 * | 5/2002 | Watson et al. ............... 707/513 |
| 2003/0126265 A1 * | 7/2003 | Aziz et al. .................. 709/227 |

* cited by examiner

*Primary Examiner*—Don Wong
*Assistant Examiner*—Hanh B Thai
(74) *Attorney, Agent, or Firm*—Townsend and Townsend and Crew LLP

(57) ABSTRACT

Systems and methods for partitioning information across multiple storage devices in a web server environment. The system comprises a web server database which includes information related creating a web site. The information is divided into partitions within the database. One of the partitions includes user information and another of the partitions includes content for the web site. Portions of the content for the web site is replicated and maintained within the partition including the user information. Further, a portion of the user information is replicated and maintained in the partition where the content for the web site is maintained. The methods include dividing information into partitions, de-normalizing the received data and replicating the data portions into the various web site locations.

18 Claims, 12 Drawing Sheets

SYSTEMS AND METHODS FOR PARTITIONING DATA ON MULTIPLE SERVERS

CROSS-REFERENCES TO RELATED APPLICATIONS

This application is being filed concurrently with related U.S. patent application Ser. No. 10/247,787, entitled "SYSTEMS AND METHODS FOR STORING AND RETRIEVING DATA IN A WEB SERVER ENVIRONMENT", and U.S. patent application Ser. No. 10/247,806, entitled "SYSTEMS AND METHODS FOR IDENTIFYING USERS AND PROVIDING ACCESS TO INFORMATION IN A NETWORK ENVIRONMENT". Each of the aforementioned applications are incorporated herein by reference for all purposes and are filed on a date even herewith.

BACKGROUND OF THE INVENTION

This invention relates in general to systems and methods for maintaining information in a database. More specifically, this invention relates to systems and methods for partitioning, de-normalizing and replicating information across a plurality of databases in a web server environment. The invention provides for maintaining relational references to data on the database while minimizing both transaction and storage costs associated with the information.

In general, economies of scale are exploited to reduce unit costs as a business grows. Thus, a larger business will generate greater profits than a smaller business providing identical services to a consumer at the same unit cost. In part, this general growth model fuels market competition and healthy economic expansion.

In contrast to the general growth model, profits generated by businesses which include a significant data storage component actually decrease as the business grows. For example, an electronic data archival business which is profitable when processing two million transactions per day may become unprofitable when processing four million transactions per day. This is typical of a number of Internet businesses which rely on monolithic databases to support Internet transactions. This decrease in profits is integrally related to increasing transaction costs associated with conventional, monolithic databases as illustrated in FIG. 1.

Referring to FIG. 1, a two dimensional graph 100 illustrates a cost per transaction 110 verses a number of transactions 120. A line 130 connecting with a line 160 illustrates cost per transaction 110 as the number of transactions 120 varies. Initially, as line 130 indicates, cost per transaction 110 decreases as the number of transactions 120 increases. This decrease in cost occurs as economies of scale are exploited. At a point 135, cost per transaction 110 equals a revenue per transaction 180. At points above revenue per transaction 180, the business is not profitable and at points below revenue per transaction 180, the business is profitable. Profits are maximized between points 140 and 150 where cost per transaction 110 is minimized. However, as illustrated by line 160, costs per transaction 110 increase at an accelerating rate where the number of transactions 120 exceeds that represented by point 150. Eventually, the business becomes unprofitable at a point 165 where cost per transaction 110 equals revenue per transaction 180. Thus, using this profit model, as a company becomes increasingly successful, profits will decline. This reality is counterintuitive to healthy competition. To allow for continued success and profitability, a scalable database providing a roughly equivalent cost per transaction as the number of transactions increases is desired. Such a database is represented by a line 170.

Thus, conventional technology results in accelerating cost per transaction as the number of transactions increases. This accelerating cost is inimical to healthy competition and business growth. Thus, there exists a need for advanced systems and methods for storing data in a way which allows a growing company to exploit economies of scale.

BRIEF SUMMARY OF THE INVENTION

The present invention provides systems and methods for maintaining information across a plurality of database partitions in a web server environment. More specifically, data is partitioned, de-normalized and distributed across a plurality of storage devices. This partitioning, de-normalizing, and distribution provides for a database with a similar cost per transaction as the size of the database is increased or decreased.

One embodiment of the present invention provides a system for partitioning information on multiple storage devices distributed within a web server environment. The system comprises a web server database including information related to creating a web site. The database is divided into two partitions with one partition including user information for users of the web site and the second partition including content for the web site. The system also includes computer readable code for replicating replicate a portion of the user information to the second partition, such that the portion of information is associated with content for the web site. In this way, data can be maintained on inexpensive, distributed storage devices while network calls associated with accessing the data are reduced.

Another embodiment of the present invention provides a method for dividing information for storage across multiple web server databases. The method includes providing two partitions and storing information about a member of a web site on one partition. A replica of the member information is stored on the other partition. A pointer is maintained on the first partition indicating the location of the data replicated on the second partition.

Yet another embodiment of the present invention provides a system for sharing data between multiple web servers. The system includes a plurality of web servers and a database accessible to the web servers. The database is divided into two partitions with one partition including a first data set and the other including a second data set. A portion of the first and second data sets is replicated on both partitions. Pointers are included on both partitions indicating the location of replicated data on the database. In one particular embodiment, one of the plurality of web servers supports a first Internet business and another one of the plurality of web servers supports a second internet business.

These and other embodiments of the present invention are described in more detail in conjunction with the text below and attached figures.

BRIEF DESCRIPTION OF THE DRAWINGS

A more complete understanding of the present invention may be derived by referring to the detailed description and claims when considered in connection the figures, wherein like reference numbers refer to similar items throughout the figures, and:

DETAILED DESCRIPTION OF THE INVENTION

The present invention provides systems and methods for maintaining information across a plurality of database partitions in a web server environment. More specifically, data is partitioned, de-normalized and distributed across a plurality of storage devices. This partitioning, de-normalizing, and distribution provides for a database with a similar cost per transaction as the size of the database is increased or decreased.

The systems and methods are best understood when described in relation to an exemplary data set. However, it will be appreciated that embodiments of the invention are not limited to only such a data set. The exemplary data set used includes data related to web sites which can be customized for groups of family members. Each web site is named by the surname of one member of the family. For example, the JONES web site can include Bob Jones (the father), Mary Jones (the mother), Fred Jones (the son), Sally Doe (the daughter), and Edward Doe (the son-in-law). Access to the JONES web site can be limited to the Jones family and those with whom the Jones family associate. Members of the Jones family may be associated with other family web sites. For example, the DOE web site can include Edward Doe (the father), Sally Doe (the mother), and Baby Doe (the daughter).

Information including member identification and member biographical information is provided for each member associated with at least one family web site. Thus, for example, a user name and password for Sally Doe is maintained as member identification information. Additionally, Sally Doe's first name, middle name, last name, nick name, title, suffix, birth date, gender, address, home phone, work phone, mobile phone number, pager number, fax number, email, Internet home page, and/or user preferences, such as, hobbies or a gift wish list and the like are maintained as member biographical information.

In addition to the member information, the web sites are also associated with content for constructing the web sites, content for the web sites, such as, messages from one member to another, large data files, such as, video or audio files, information about browsers used by particular members of the web site, and internal system data related to operating the web site.

While the systems and methods of the present invention are described below with reference to the exemplary data set, it should be recognized that many data sets can be partitioned, de-normalized, and replicated according to the present invention. For example, a data set may comprise data about inter-related businesses and/or social organizations. The present invention is particularly useful for partitioning, de-normalizing, replicating, and storing data sets which exhibit many-to-many relationships, such as the family relationships of the exemplary data set.

Figure 1:
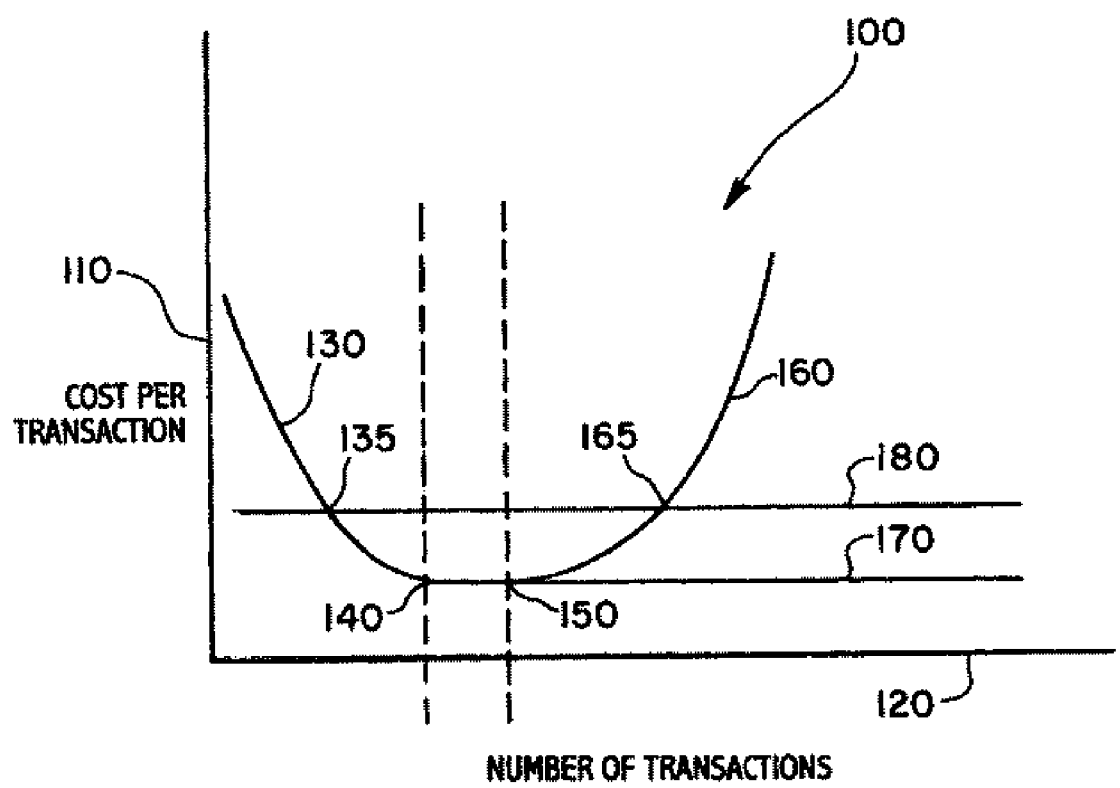
FIG. 1 illustrates a cost per transaction verses size curve of a conventional database.
Figure 2:
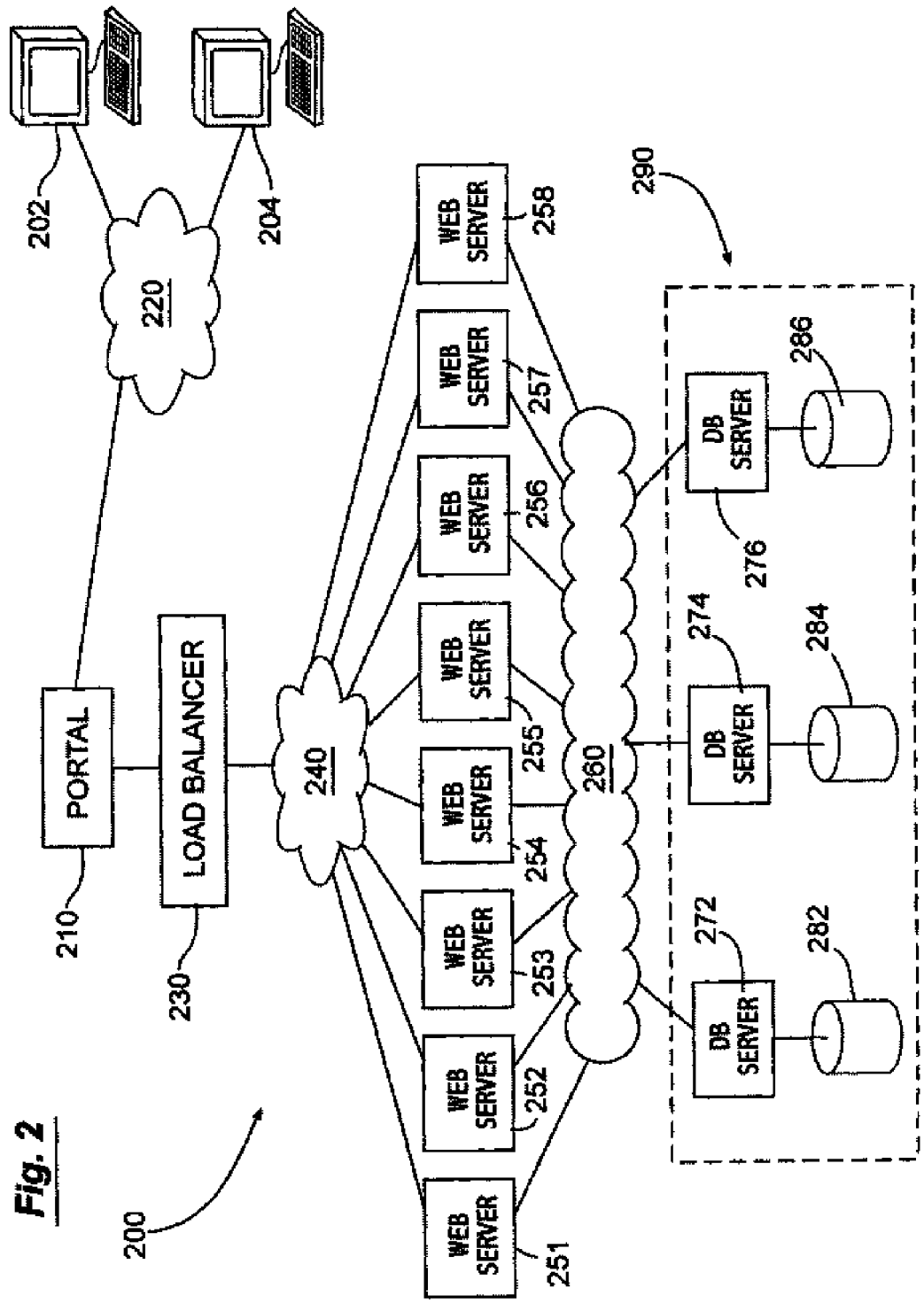
FIG. 2 illustrates a web server environment comprising a distributed database according to the present invention.

FIG. 2 illustrates an embodiment of a web server environment 200 comprising a database 290 according to the present invention. Web server environment 200 comprises a portal 210 connected to the Internet 220. A number of user terminals 202, 204 are capable of connecting to portal 210 via the Internet 220. Portal 210 connects to a load balancer 230. Load balancer 230 distributes access loads across a number of web servers 251, 252, 253, 254, 255, 256, 257, 258 which are connected to load balancer 230 via a network 240 and to database servers 272, 274, 276 via a network 260. It should be recognized by one skilled in the art that the number of web servers can be different from that illustrated in web server environment 200. For example, in one particular embodiment, web server environment 200 is comprised of sixteen web servers. In addition, one skilled in the art will recognize that additional portals 210, storage devices 282, 284, 286, and/or database servers 272, 274, 276 can be included in web server environment 200.

Database 290 comprises multiple database servers 272, 274, 276 associated with storage devices 282, 284, 286, respectively. While FIG. 2 illustrates a particular configuration for database 290, it should be recognized by one skilled in the art that database 290 can be configured in a number of ways. For example, database 290 can include a single database server associated with a plurality of storage devices. Additionally, database 290 can comprise one or more of the databases described generally in U.S. patent application Ser. No. 10/247,787 entitled "SYSTEMS AND METHODS FOR STORING AND RETRIEVING DATA IN A WEB SERVER ENVIRONMENT", which is incorporated herein by reference for all purposes.

Further, database 290 can be comprised of more or fewer than the three storage devices 282, 284, 286 illustrated in FIG. 2. For example, in one particular embodiment, database 290 is comprised of seven storage devices. Storage devices 282, 284, 286 can be any type of mass storage device including, but not limited to, Integrated Drive Electronics (IDE) mass storage devices, Small Computer System Interface (SCSI) mass storage devices, and/or combinations thereof. In one embodiment, storage devices 282, 284, 286 are comprised of a number of IDE mass storage devices combined into a redundant array as taught in the previously referenced patent application.

Network 240 provides a functional connection between load balancer 230 and web servers 251, 252, 253, 254, 255, 256, 257, 258. Network 240 can be any network capable of transferring data between one or more web servers 251, 252, 253, 254, 255, 256, 257, 258 and load balancer 230. In some embodiments, network 240 comprises a direct wired connection between each of the web servers and the load balancer. In other embodiments, network 240 is a Local Area Network (LAN). It should be recognized by those skilled in the art that network 240 can be a number of other network types including a Wide Area Network (WAN), an optical network, a wireless network, a crossing network, or any other network providing a functional connection between load balancer 230 and the web servers.

Network 260 provides a functional connection between web servers 251, 252, 253, 254, 255, 256, 257, 258 and database servers 272, 274, 276. Network 260 can be any network capable of transferring data between web servers 251, 252, 253, 254, 255, 256, 257, 258 and database servers 272, 274, 276. In some embodiments, network 260 comprises a crossing network allowing for data transfer between database servers 272, 274, 276 and web servers 251, 252, 253, 254, 255, 256, 257, 258. In other embodiments, network 260 comprises a direct wired connection between each of the web servers and each of the database servers. In yet other embodiments, network 260 is a Local Area Network (LAN). It should be recognized by those skilled in the art that network 260 can be a number of other network types including a WAN, an optical network, a wireless network, or other like network providing functional coupling.

Portal 210 can be a microprocessor based machine capable of providing access to user terminals 202, 204 and distributing the access to one or more web servers 251, 252, 253, 254, 255, 256, 257, 258 using load balancer 230. In an embodiment, portal 210 is a web server, which provides access to a particular Internet site, such as, for example, an Internet business which archives member data and distributes the data to other members. To access the Internet site, a user provides the address, or Uniform Record Locator (URL), for portal 210 to a browser (not shown) running on user terminal 202, 204. The browser then requests access from portal 210 across the Internet 220. In response to the user's request, portal 210, using load balancer 230 selects one of the web servers 251, 252, 253, 254, 255, 256, 257, 258 to satisfy the user's request. In satisfying the request, the selected web server accesses database 290 to retrieve and/or store information related to the user's request. Which storage device(s) 282, 284, 286 is/are accessed depends on where information related to the user's request is located. Location of user information is discussed in more detail below with reference to FIGS. 4 through 8.

Web servers 251, 252, 253, 254, 255, 256, 257, 258 can be microprocessor based machines capable of receiving user requests, retrieving and storing data to database 290, assembling data to satisfy user requests, presenting Internet pages and any other function germane to supporting web functionality and/or an Internet site.

Database servers 272, 274, 276 can be micro processor based machines providing access to storage devices 282, 284, 286. Along with providing access to storage devices 282, 284, 286, database servers 272, 274, 276 provide maps and access information related to storage devices 282, 284, 286.

Figure 3:
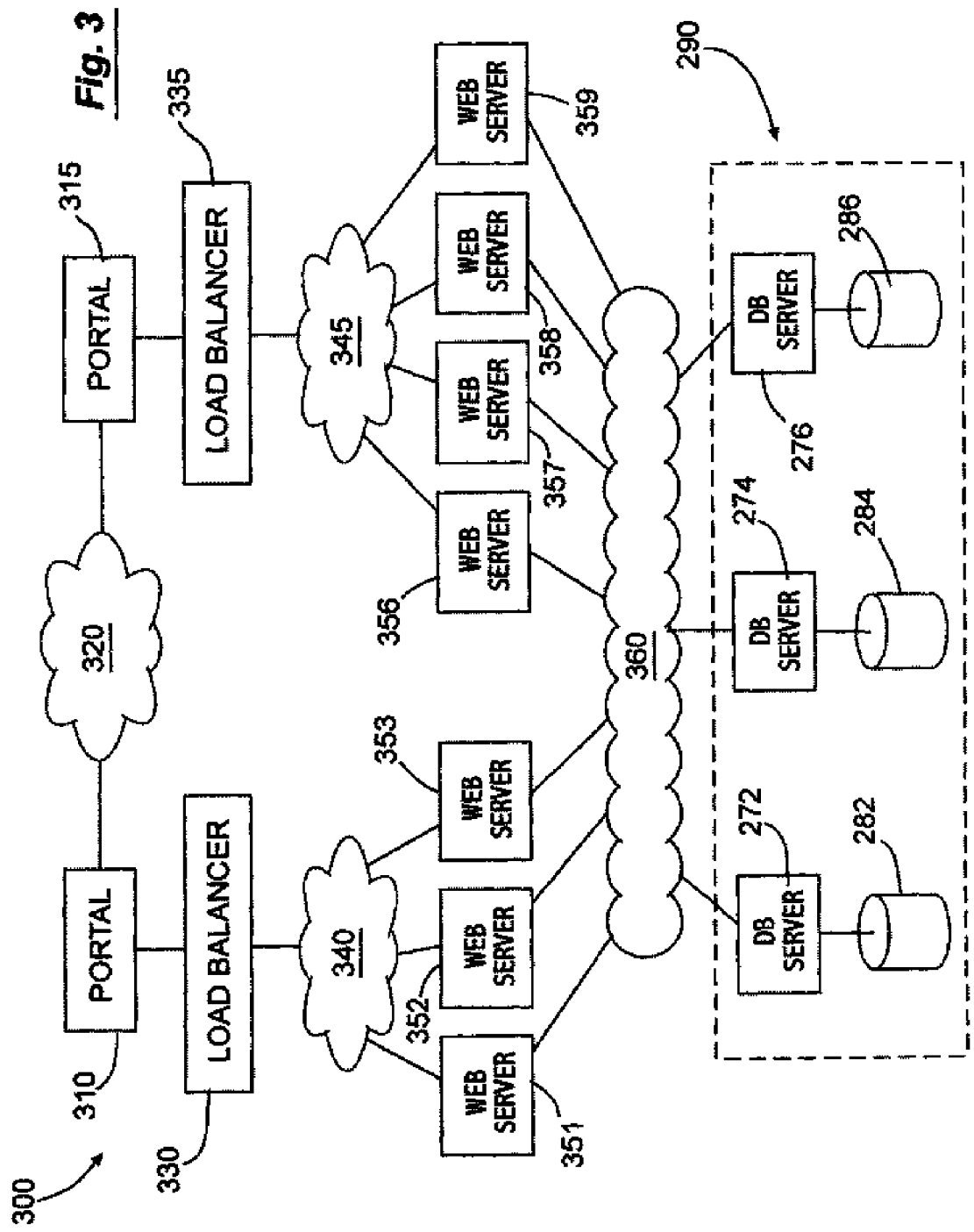
FIG. 3 illustrates a web server environment comprising two portals accessing a distributed database according to the present invention.

Referring to FIG. 3, an embodiment of a dual web server system 300 sharing a single database 290 is illustrated. As previously discussed, database 290 comprises database servers 272, 274, 276 associated with storage devices 282, 284, 286, respectively. Dual web server system 300 comprises a portal 310 and a portal 315 each connected to the Internet 320. A number of users (not shown) are capable of connecting to either or both portals 310 and 315 via the Internet 320. Portal 310 connects to a load balancer 330 and portal 315 connects to a load balancer 335. Load balancer 330 distributes access loads across a number of web servers 351, 352, 353 and load balancer 335 distributes access loads across a number of web servers 356, 357, 358, 359. Each of the web servers are connected to database servers 272, 274, 276 via a network 360. Database servers 272, 274, 276 are connected to storage devices 282, 284, 286, respectively. A combination of storage devices 282, 284, 286 form a database 290 according to the present invention.

Portals 310, 315 can support the same or different Internet pages. In one embodiment, portal 310 provides an access point to one Internet site, while portal 315 provides an access point to a different Internet site. For example, portal 310 can provide access to a genealogy related Internet site operated by one company and portal 315 can provide access to a user data archival site operated by a second company. Thus, using dual web server system 300, two or more Internet sites operated by different entities can share the database. This is particularly useful where a number of users are common to two or more Internet sites. By providing such a shared database configuration, data duplication is minimized and storage costs are reduced. While FIG. 3, shows two Internet sites sharing common database 290, it should be recognized that configurations supporting more than two sites are possible according to the present invention.

Figure 4:
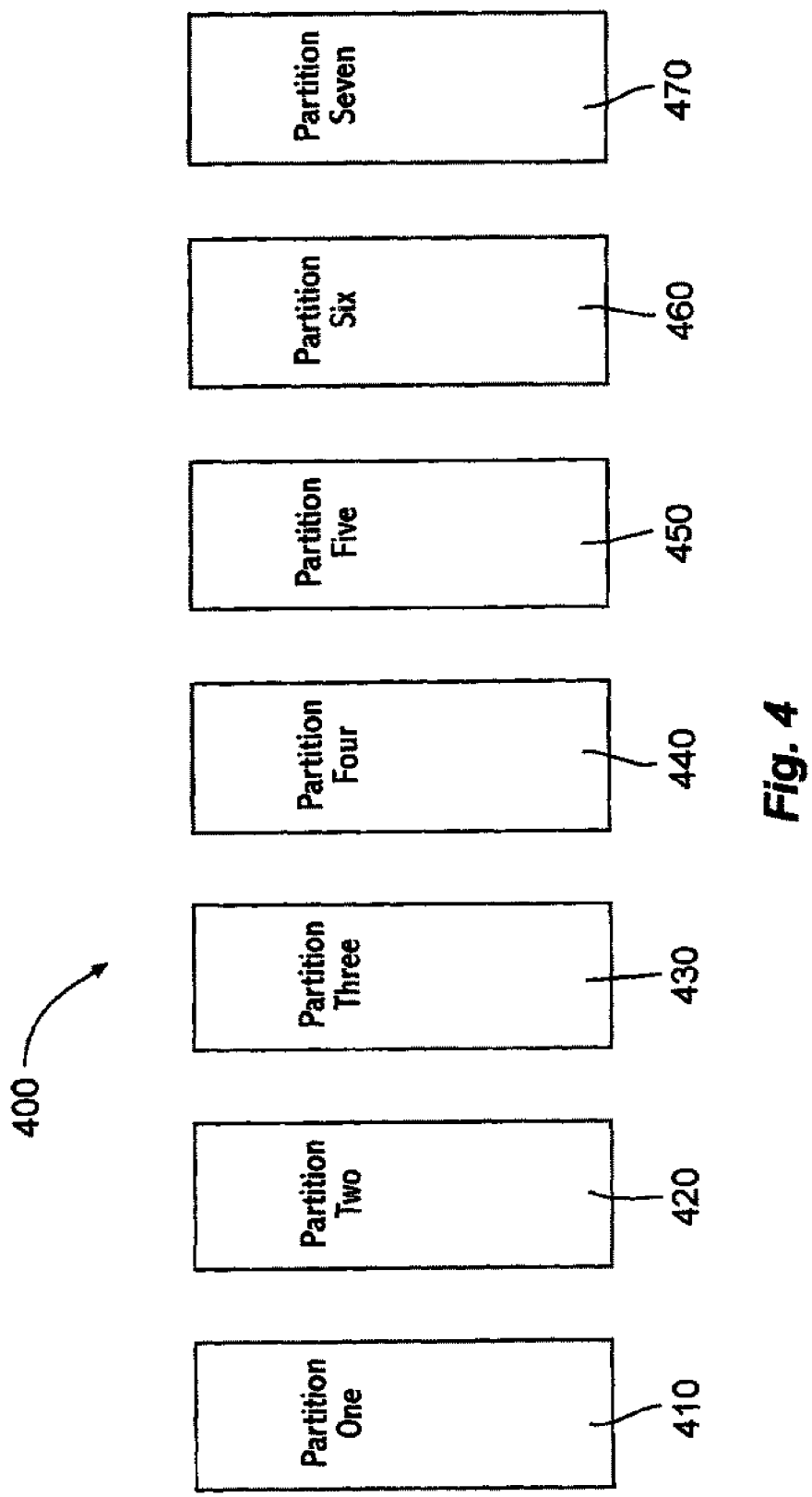
FIG. 4 illustrates partitions of a database according to the present invention.

Referring to FIG. 4, an embodiment of database 290 according to the present invention is illustrated. Database 290 is divided into seven partitions numbered one through seven 410, 420, 430, 440, 450, 460, 470. Each of the partitions can be maintained on separate storage devices or can be combined on a single storage device. For example, in one embodiment, partition one 410 is maintained on one storage device, partitions two through five 420, 430, 440, 450 are maintained on a second storage device, and partitions six and seven 460, 470 are maintained on a third storage device. Where two or more partitions are maintained on a single storage device, the partition can be represented as a block of storage space within the particular storage device.

While FIG. 4 illustrates database 290 comprising seven partitions, it should be recognized that database 290 can comprise any number of partitions. Further, each of the partitions can comprise the same storage capacity or they can comprise different storage capacities. Modifying the storage capacity of the partitions allows for utilizing a high percentage of available storage capacity. This advantageously results in ideal sizing of database 290.

Thus, in some embodiments where partition one 410 comprises a first data type and partition two comprises a second data type, partition one 410 can include less storage capacity than partition two 420 where the quantity of the first data type is less than the quantity of the second data type. By providing partition two 420 larger than partition one 410, the storage efficiency of database 290 is increased as the percentage of utilized storage capacity is maximized. Thus, the present invention provides systems and methods for using scalable databases, such as those taught in the aforementioned "SYSTEMS AND METHODS FOR STORING AND RETRIEVING DATA IN A WEB SERVER ENVIRONMENT". The present invention is also sufficiently flexible to allow for adjustment of individual partitions to match changing database needs.

In one particular embodiment, each of the partitions comprises one particular data type from the exemplary data set. More specifically, member biographical information and content for the web sites is maintained on partition one 410 and partition two 420, respectively. Other data types from the exemplary data set are maintained in partitions three through seven 430, 440, 450, 460, 470, respectively.

As described below with reference to FIG. 5, each of the partitions can be divided into sub-partitions. Further, as described below with reference to FIG. 6, each of the sub-partitions can be divided into blocks. Each of the sub-partitions and/or blocks can be maintained on separate storage devices, or combined with other partitions, sub-partitions, and/or blocks on a single storage device. For example, in some embodiments, a block can be stored on a one storage device, a sub-partition on another storage device, and two partitions stored together on yet another storage device.

Figure 5:
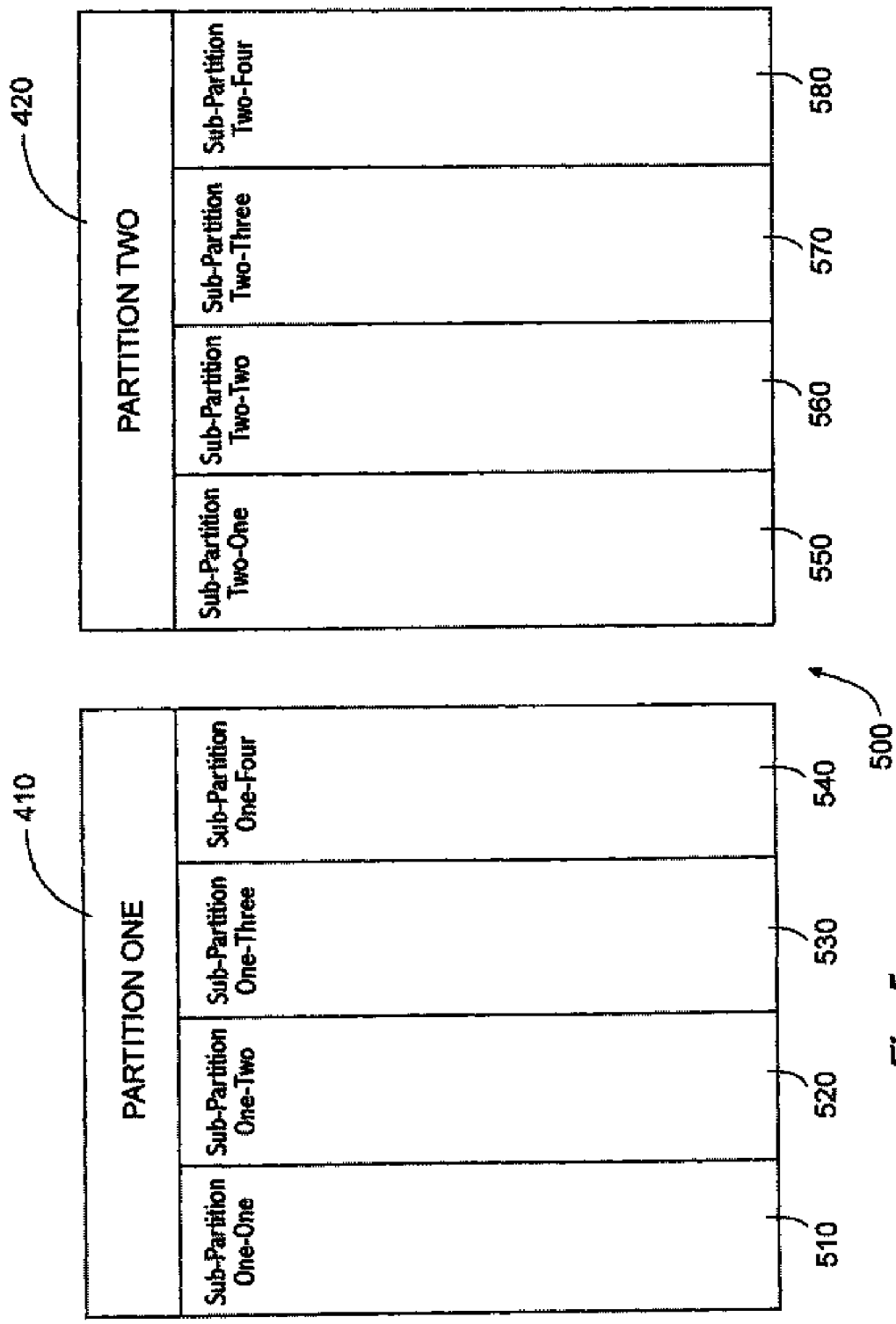
FIG. 5 illustrates sub-partitions of a database according to the present invention.

Referring to FIG. 5, a portion 500 of database 290 is illustrated. Portion 500 comprises partition one 410 and partition two 420. Partition one 410 is divided into a sub-partition one-one 510, a sub-partition one-two 520, a sub-partition one-three 530, and a sub-partition one-four 540. Partition two 420 is divided into a sub-partition two-one 550, a sub-partition two-two 560, a sub-partition two-three 570, and a sub-partition two-four 580. In some embodiments, each of the sub-partitions comprise a sub-set of information maintained on the divided partition. Thus, for example, where member biographical information is stored on partition one 410, sub-partition one-one 510 can include biographical information related to some of the members.

Each of the sub-partitions can comprise the same or different storage capacities. By providing differential storage capacities, database 290 can be advantageously adjusted to maximize the percentage of utilized storage space. For example, where the sub-set of data maintained on sub-partition one-one 510 requires greater storage capacity than the sub-set of data maintained on sub-partition one-two 520, sub-partition one-two 520 can be smaller than sub-partition one-one 510. As previously discussed, this allows for maximizing storage utilization.

While FIG. 5 illustrates partition one 410 and partition two 420 divided into sub-partitions, it should be noted that all partitions of database 290 can be divided. Alternatively, some partitions can be divided, while other partitions remain undivided. Also, it should be recognized that any number of sub-partitions can be provided according to the present invention.

Figure 6:
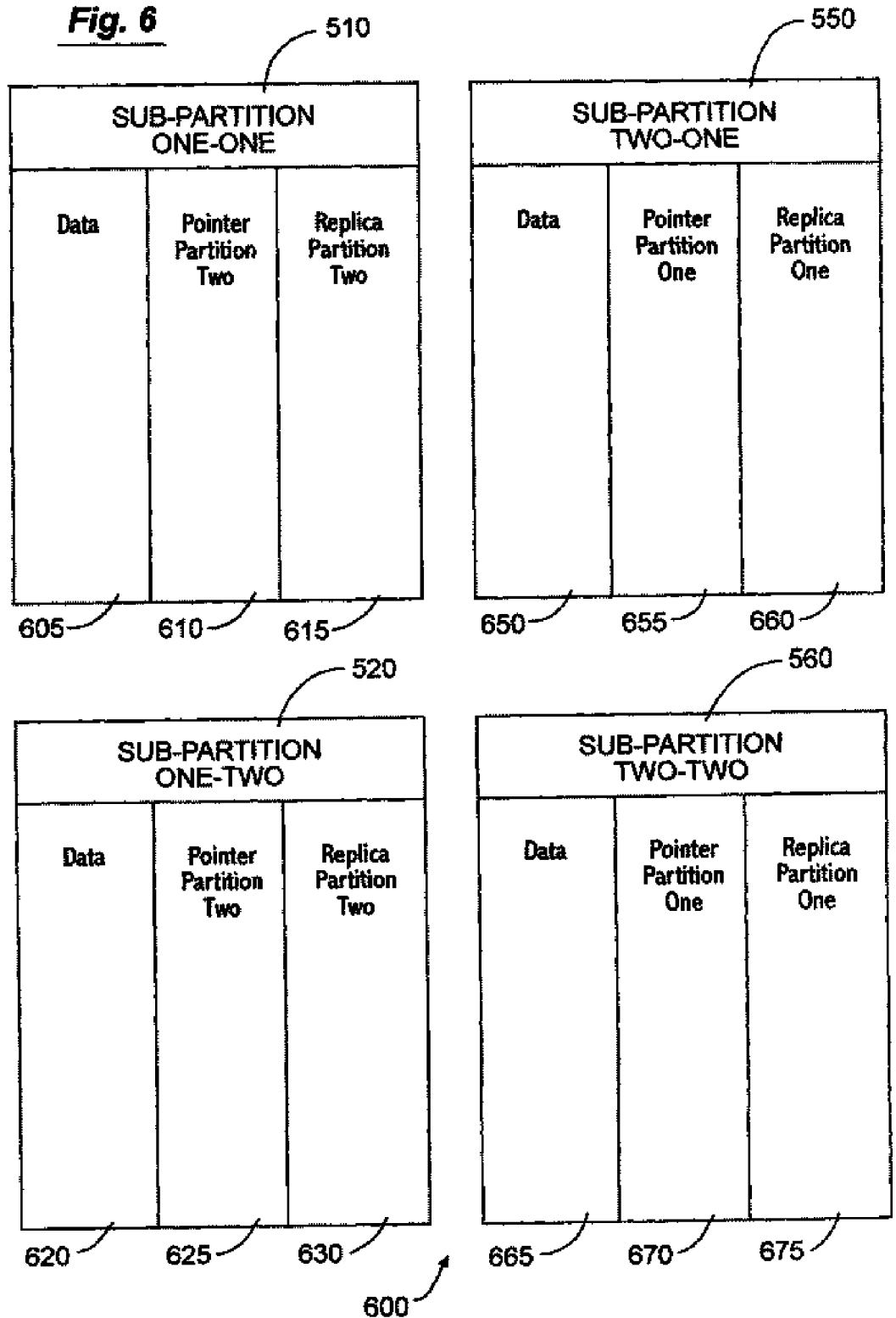
FIG. 6 illustrates blocks within sub-partitions of a database according to the present invention.

Referring to FIG. 6, a portion 600 of portion 500 is illustrated. Portion 600 comprises sub-partition one-one 510, sub-partition one-two 520, sub-partition two-one 550, and sub-partition two-two 560. Each of the sub-partitions are divided into three blocks. The three blocks include a data block, 605, 620, 650, 665, a pointer block 610, 625, 655, 670, and a replica block 615, 630, 660, 675. As with the partitions and sub-partitions, each of the blocks can comprise different quantities of storage space. Further, it will be evident to one skilled in the art that the sub-partitions can be divided into any number of blocks. Use of the data blocks is further described below with reference to FIGS. 7 and 8.

In some embodiments, the exemplary data set is distributed across database 290. More specifically, partition one 410 comprises member biographical information, partition two 420 comprises content for the web sites, partition three 430 comprises member identification information, partition four 440 comprises content for constructing the web sites, partition five 450 comprises large data files, partition six 460 comprises browser information, and partition seven 470 comprises internal system data.

Thus, partition one 410 comprises member biographical information for all users with access to web environment 200. In some embodiments, sub-partition one-one 510 includes information related to all users with a last name starting with the letters A through G, sub-partition one-two 520 includes information related to all users with a last name starting with the letters H through M, sub-partition one-three 530 includes information related to all users with a last name starting with the letters N through R, and sub-partition one-four 540 includes information related to all users with a last name starting with the letters S through Z. In an embodiment, each of the sub-partitions comprises a separate storage device including a storage capacity related to the quantity of information stored on the sub-partition. Thus, each sub-partition can be a different size and can be adjusted to maximize storage efficiency.

In other embodiments, each of the sub-partitions comprise separate storage devices of equal size. To maximize storage efficiency in such a configuration, the exemplary data set is divided evenly across the available sub-partitions. For example, member biographical information received can be stored on a particular sub-partition with the most available storage capacity. In one useful embodiment, when a new user is introduced to web environment 200, a sub-partition is identified which has sufficient storage space to accommodate the user's information. The user's information is then stored to the identified sub-partition. If at any time, no space is available on any sub-partition, an additional sub-partition can be added and/or the capacity of one or more sub-partitions can be increased. Conversely, where user data is removed, member information can be combined in fewer sub-partitions and one or more sub-partitions removed from database 290 or the size of an individual sub-partition can be reduced to match the data within the sub-partition. As previously noted, a scalable database as taught in "SYSTEMS AND METHODS FOR STORING AND RETRIEVING DATA IN A WEB SERVER ENVIRONMENT" may be fully utilized in relation to the systems and methods of the present invention.

Figure 7:
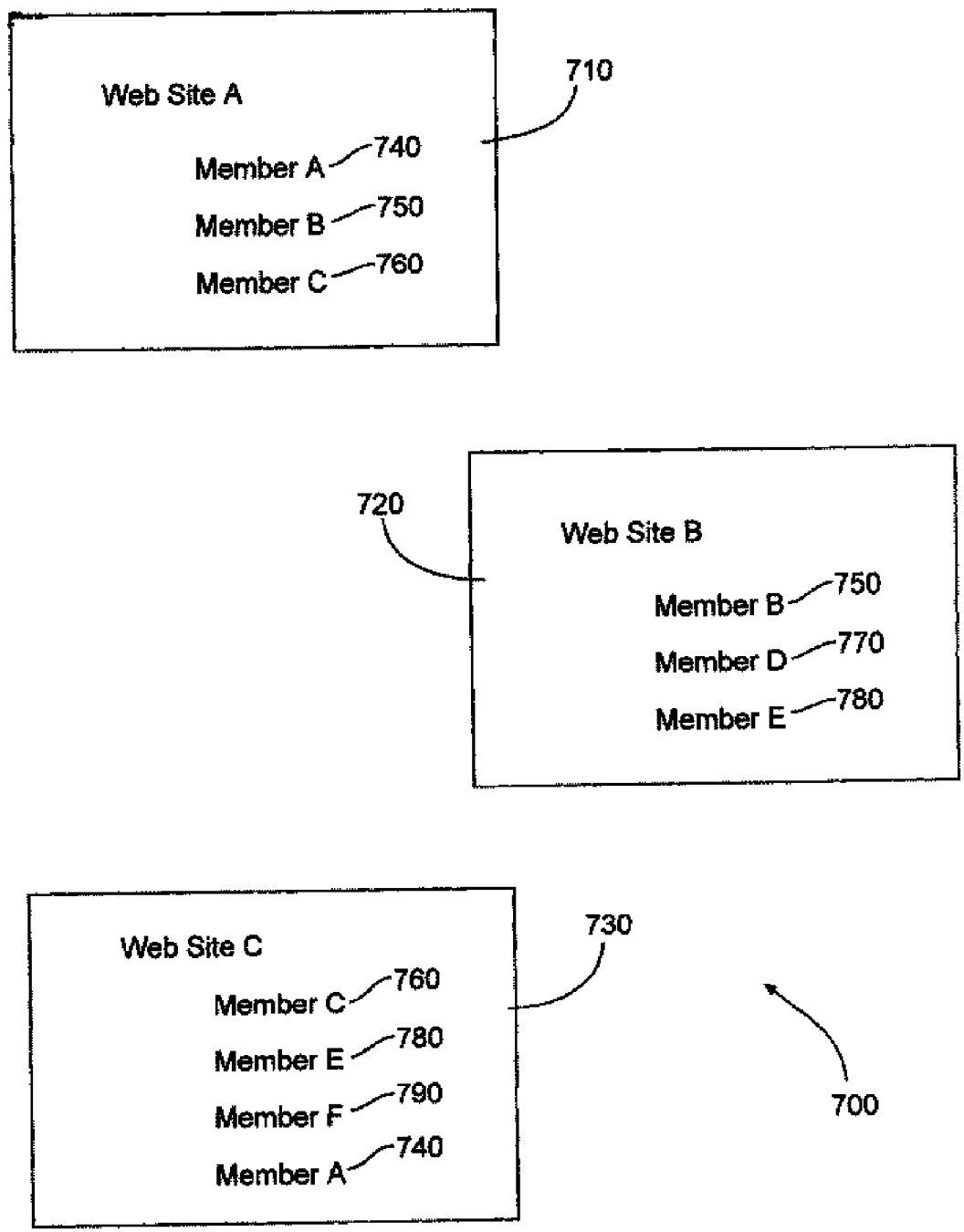
FIG. 7 illustrates a graphical representation of an exemplary data set.

FIG. 7 is a graphical representation 700 of a relationship between data types from the exemplary data set. Referring to FIG. 7, graphical representation 700 includes a web site A 710, a web site B 720, and a web site C 730. For purposes of illustration, each of the web sites is comprised of member biographical information and content for the web site. Web site A 710 and web site B 720 can be, for example, the JONES web site and the DOE web site, respectively.

Graphical representation 700 further includes member biographical information related to a member A 740, a member B 750, a member C 760, a member D 770, a member E 780, and a member F 790. As illustrated, each of the members can be associated with more than one web site. For example, member A 740 is associated with web site A 710 and web site C 730, while member B 750 is associated with web site A 710 and web site B 720. In some embodiments, membership in each of the web sites is limited to family members. Thus, for example, member A 740 may be a sibling of member B 750 and member C 760. Other family relationships can be imagined between the other members. In other embodiments, the relationship between the members can be business, casual, or otherwise. For example, web site A 710 could be provided for sporting enthusiasts, while site B 720 could be provided for employees of a particular business. Thus, any combination of sites including a number of inter-related members is possible according to the present invention.

As previously mentioned, member biographical information related to member A 740, member B 750, member C 760, member D 770, member E 780, and member F 790 is maintained on partition one 410 of database 290. In one embodiment, information related to member A 740 and member B 750 is maintained in sub-partition one-one 510, information related to member C 760 is maintained in sub-partition one-two 520, information related to member D 770 and member E 780 is maintained in sub-partition one-three 530, and information related to member F 790 is maintained in sub-partition one-four 510.

Content for web site A 710, web site B 720, and web site C 730 is maintained on partition two 420. More specifically, content for web site A 710 is maintained on sub-partition two-one 540, content for web site B 720 is maintained in sub-partition two-two 550, and content for web site C 730 is maintained in sub-partition two-three 560.

Figure 8A:
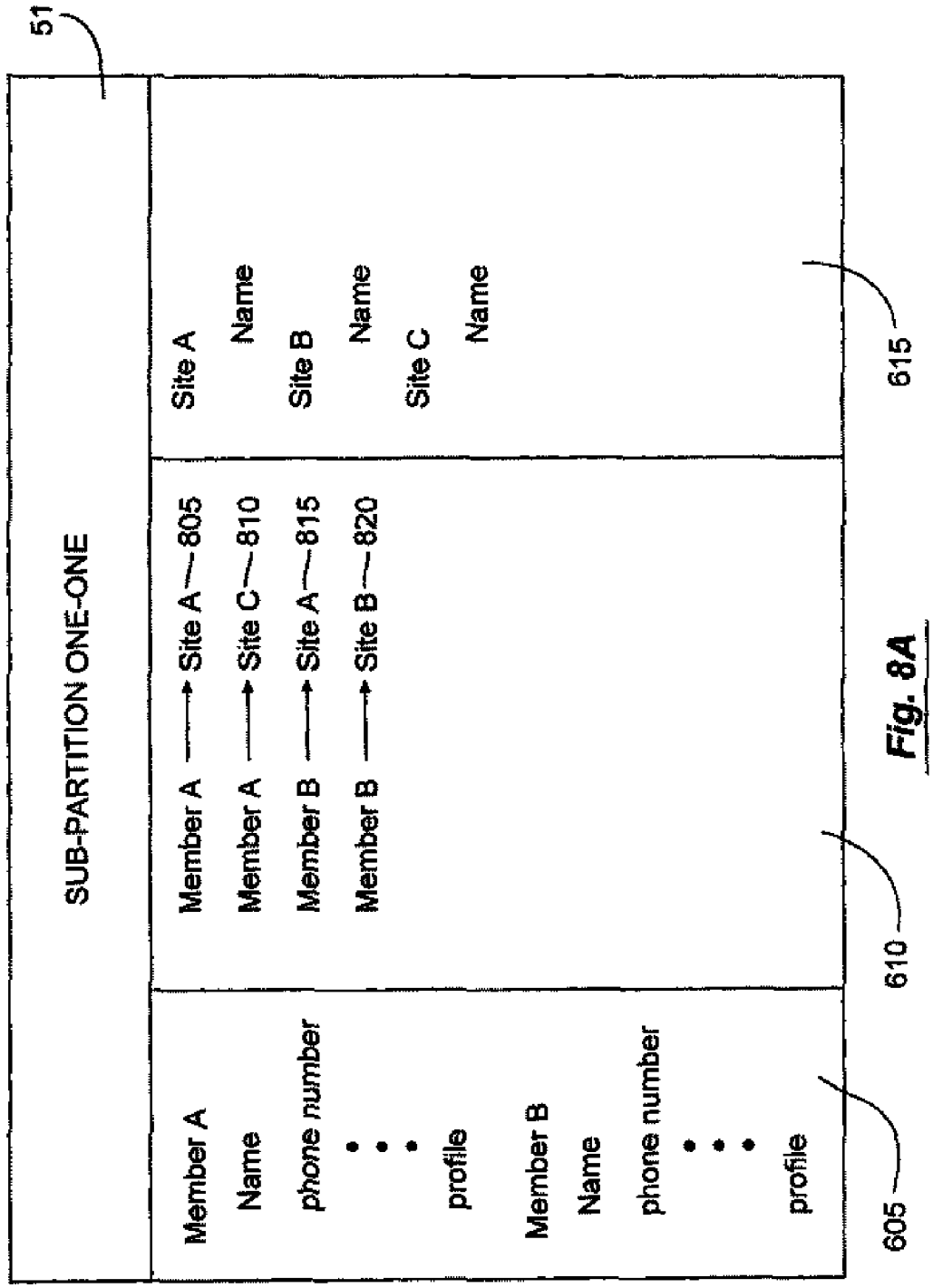
FIGS. 8A-8D illustrate the exemplary data set distributed across a database according to the present invention.

Referring to FIGS. 8A-8D, the data included in graphical representation 700 is described with reference to specific locations within database 290. Referring to FIG. 8A, sub-partition one-one 510 is illustrated. Data block 605 comprises all member biographical information related to member A 740 and member B 750. In addition, pointer block 610 contains pointers to all sites to which member A 740 and member B 750 are members. Thus, pointer block 605 includes a pointer 805 linking member A 740 with web site A 710, a pointer 810 linking member A 740 with web site C 730, a pointer 815 linking member B 750 with web site A 710, and a pointer 820 linking member B 750 with web site B 720.

Replica block 615 includes replicated information about each web site to which either member A 740 or member B 750 are members. Thus, replica block 615 includes replicated information about web-site A 710, web-site B 720, and web site C 730. The information in replica block 615 is replicated from the primary storage area for information about the particular web sites. The primary storage location for the web site data is partition two 420, which is described in further detail below.

As can be appreciated at this juncture, within partition one 410, not only is all biographical information related to member A 740, member B 750, and member C 760 stored, but relationships between the members and other data in database 290 is maintained. By co-locating links to member related sites and actual replicas of web site content, most information related to a particular member can be provided by accessing a single partition of database 290. Preferably, only information which is commonly accessed when accessing member biographical information is replicated in replica block 615. By maintaining commonly accessed data within the same data partition, a network call to another partition is avoided. Avoiding network calls reduces both processor and time costs. It should be noted that replication can be minimized to include only commonly accessed information. Limiting replication in this way avoids undue duplication of data within database 290. In one embodiment, the information included in replica block 615 includes the names of the web-sites.

Because of the many-to-many relationship of data maintained on database 290, de-normalizing and replicating of data are useful to improve performance within a database distributed between web servers. De-normalizing and replicating the data includes maintaining more than one copy of a particular data element in different locations within database 290. Because of this, any time a de-normalized and replicated piece of information is modified, it must be modified in a number of locations across database 290. This modification of multiple areas of database 290 is complex and time consuming. Thus, data chosen for replication is preferably limited to data which does not change often, such as, for example, a web site name or a member's name.

In some embodiments, data commonly used for listing operations is replicated. For example, a list of news articles and/or images associated with a particular member will contain the name of the web sites on which the articles and or images are available. These listing operations perform relational joins within database 290. A relational join can very quickly and efficiently pull all information related to a specific member together where the information resides on the same partition. In contrast, where a member's information is disbursed across multiple partitions, a network call to other partitions would be required, which significantly impacts performance.

Figure 8B:
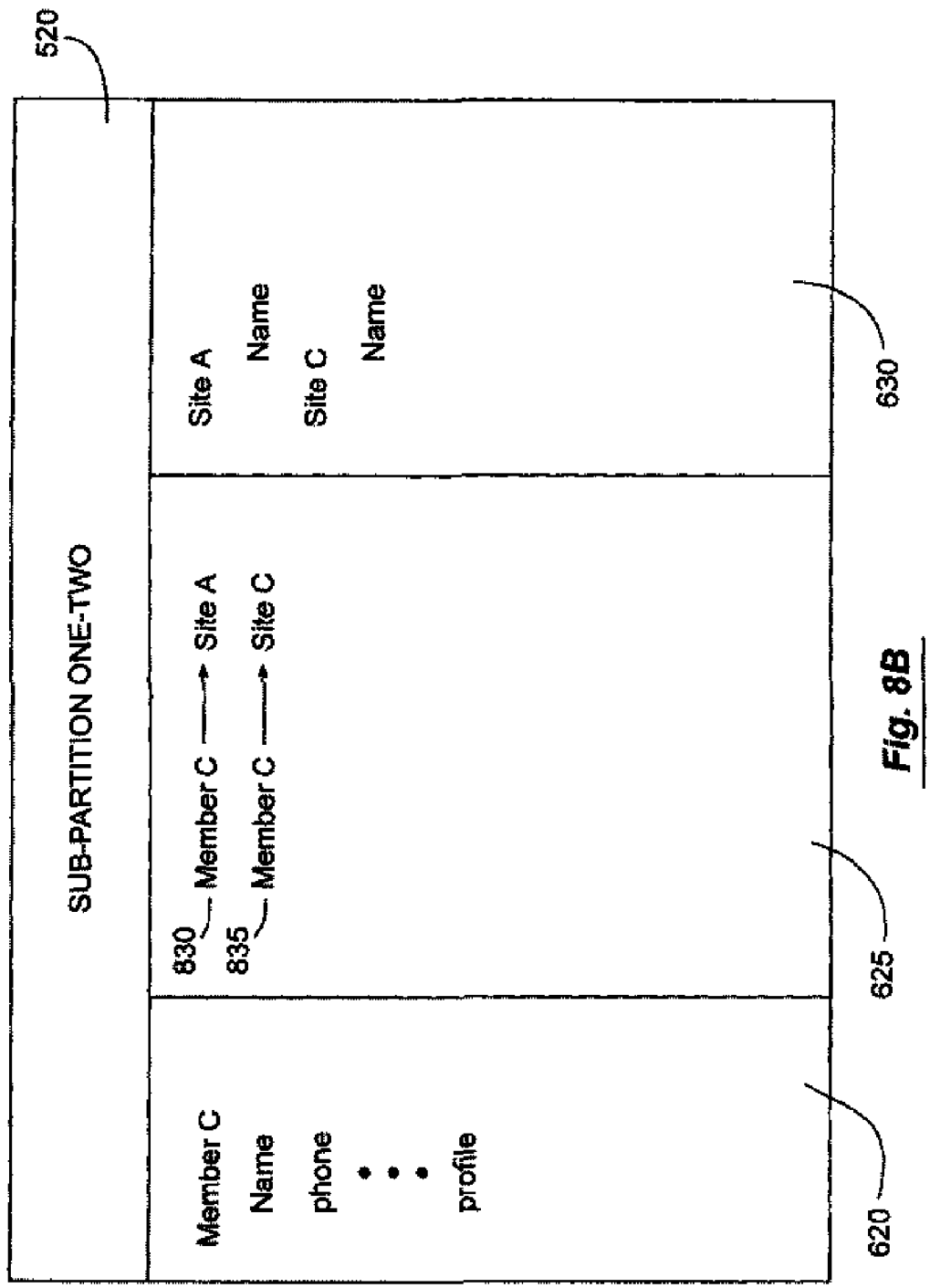

Referring to FIG. 8B, sub-partition one-two 520 is illustrated. Data block 620 comprises all member biographical information related to member C 760. In addition, pointer block 625 contains pointers to all sites to which member C 760 is associated. Replica block 630 includes replicated information about each web site to which member C 760 is associated.

Figure 8C:
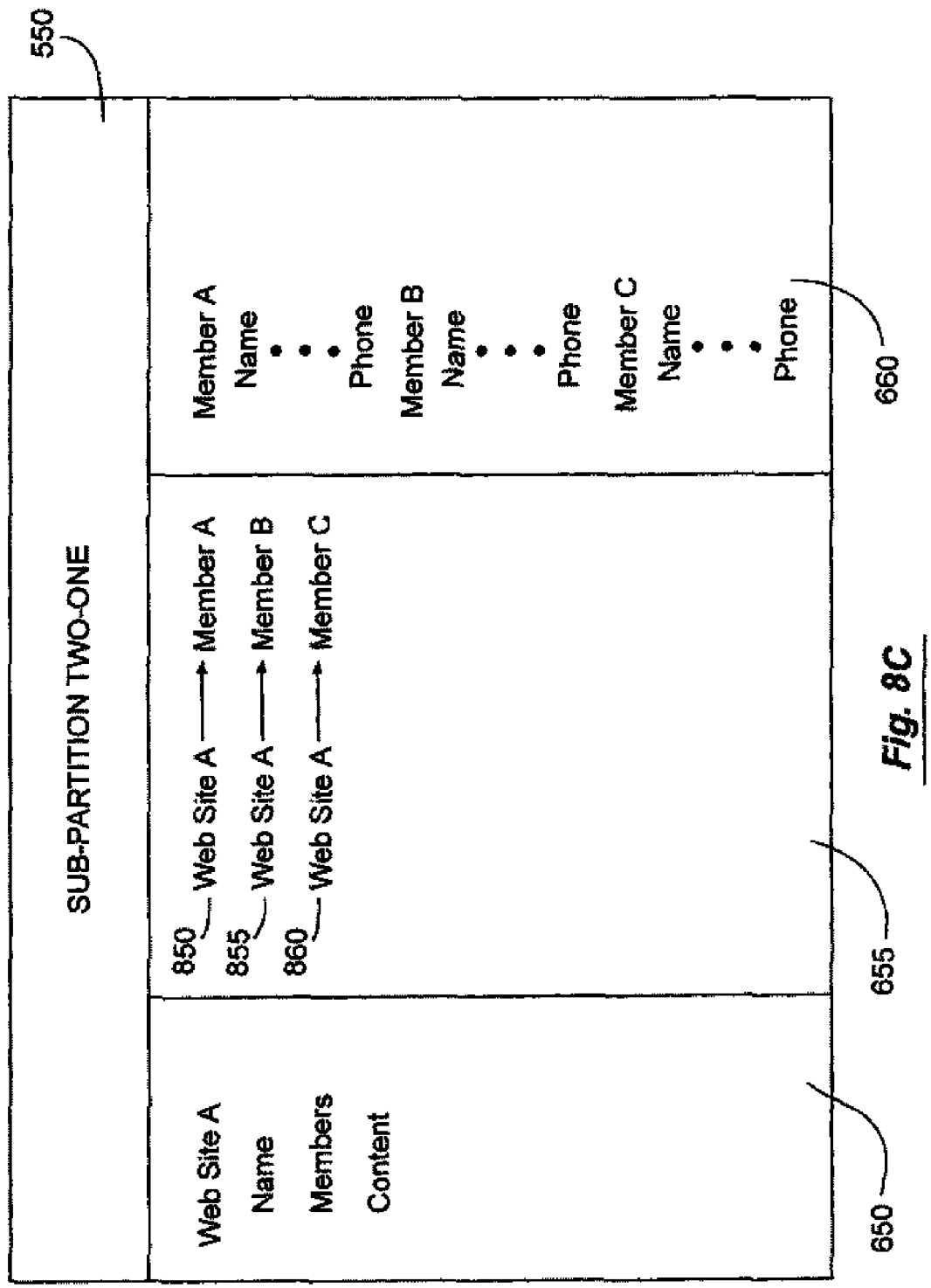

Referring to FIG. 8C, sub-partition two-one 550 including data block 650, pointer block 655, and replica block 660 is illustrated. Data block 650 comprises all content for web site A 710. In addition, pointer block 655 contains pointers to member biographical information for members belonging to web site A 710. Thus, pointer block 655 includes a pointer 850 linking web site A 710 with member A 740, a pointer 855 linking web site A 710 with member B 750, and a pointer 860 linking web site A 710 with member C 760.

Replica block 660 includes replicated information about each member belonging to web site A 710. Thus, replica block 660 includes replicated information about member A 740, member B 750, and member C 760 The information in replica block 760 is replicated from partition one 410, which is the primary storage area for the member biographical information.

Similar to replica block 615 described above, replica block 655 maintains information commonly accessed in relation to web site A 710 within the same partition as content for web site A 710. By co-locating this information, most accesses to web site A 710 can be supported by a single partition. In one embodiment, the information included in replica block 655 includes the name, address, phone number, and email address of members associated with web site A 710.

Figure 8D:
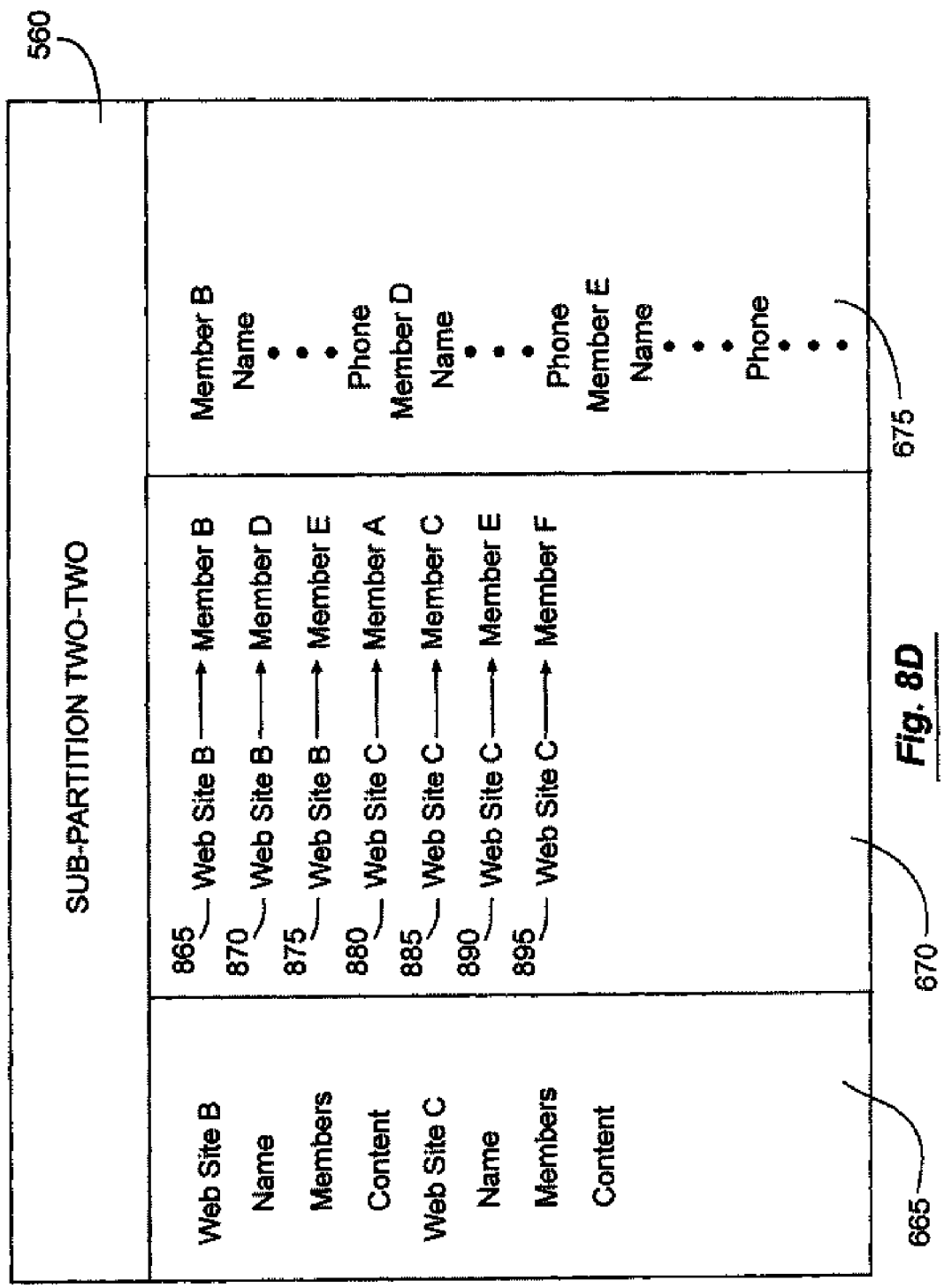

Referring to FIG. 8D, sub-partition two-two 560 including data block 665, pointer block 670, and replica block 675 is illustrated. Data block 665 comprises all content for web site B 720 and web site C 730. Pointer block 670 contains pointers to member biographical information for members belonging to web site B 720 and web site C 730 and replica block 675 includes replicated information about each member belonging to either web site B 720 or web site C 730.

Methods of using database 290 comprise receiving data, partitioning the data, de-normalizing the data, storing the data in a primary location and replicating core elements of the data across database 290. Partitioning the data comprises gathering common data types together within partitions of database 290. This allows millions of records related to a particular web site, or groups of web sites to be maintained on small, inexpensive databases instead of one large, expensive database.

Figure 9:
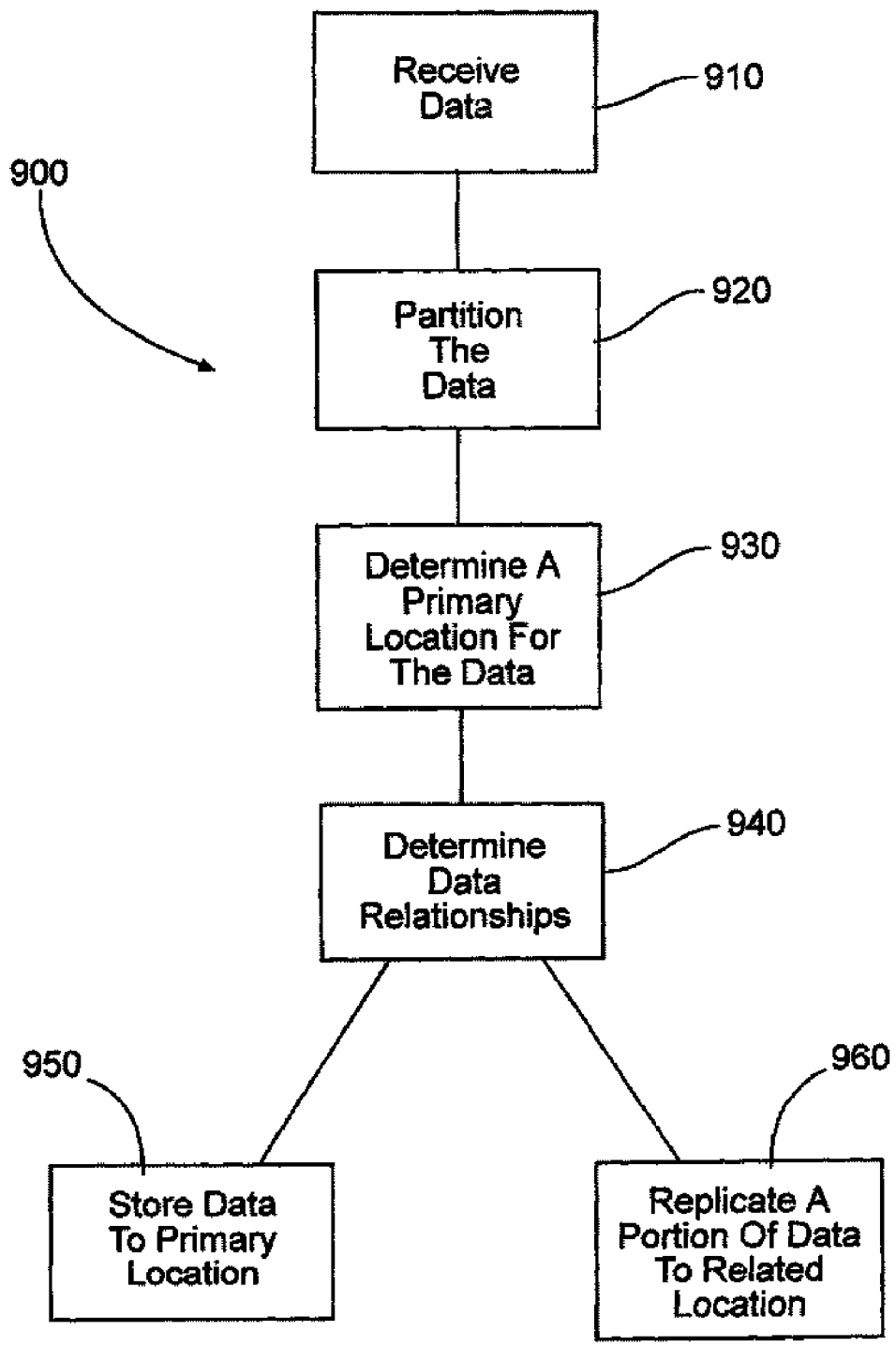
FIG. 9 illustrates a flow diagram of a method according to the present invention.

FIG. 9 shows a flow diagram 900 illustrating an embodiment of a method according to the present invention. Flow diagram 900 includes a step 910 in which data is received. The data received can include many types of data, such as, for example, a message to be posted on the JONES web site from Sally Doe to all members of the web site, a photograph of Sally Doe, an address for Sally Doe, browser information related to Sally Doe, or any other type of data.

The received data is partitioned into common data types in step 920. For example, the address of Sally Doe is grouped with member biographical information, the photograph and the message are grouped with web site content, and the browser information is grouped with browser information. After partitioning the data in step 920, a location for the grouped information is determined in step 930. For example, the member information can be grouped with similar information about other members and the browser information can be grouped with other browser information.

Relationships between data within database 290 are then determined in step 940. For example, Sally Doe's name is related to the Jones web site, the Doe web site, to Sally Doe's member information, and to Sally Doe's Browser information. In steps 950 and 960, the data is stored to various parts of the database. For example, in step 950, Sally Doe's name is stored in its primary location in partition one 410. In step 960, a replica of Sally Doe's name is stored in partition two 420. In some embodiments, storage of the primary and replica data are done concurrently.

In light of the preceding discussion several advantages of the present invention are evident. For example, the present invention provides systems and methods for fully utilizing scalable, distributed databases. The systems and methods according to the present invention allow for using small, inexpensive storage devices and/or databases in a way that provides performance compatible with larger, more expensive databases. The present invention is also particularly useful for allowing multiple companies to share a common database.

Although the invention is described with reference to specific embodiments and figures thereof, the embodiments and figures are merely illustrative, and not limiting of the invention. Rather, the scope of the invention is to be determined solely by the appended claims.

What is claimed is:

1. A method for partitioning data, the method comprising:
   partitioning a first data set into one or more sub-partitions, wherein the first data set comprises biographical information relating to users;
   specifying a relationship between data within at least one of the sub-partitions and data within a second data set, wherein the second data set comprises website content for a plurality of websites and wherein the relationship identifies at least one user who is a member of at least one of the plurality of web sites;
   replicating at least a portion of data within the second data set that relate to data within the at least one sub-partition based on the relationship to the at least one sub-partition; and
   creating a website comprising data within the at least one sub-partition.

2. The method of claim 1, further comprising copying new or updated data within the second data set that relate to data within the at least one sub-partition based on the relationship to the at least one sub-partition.

3. The method of claim 1, further comprising storing the relationship in the at least one sub-partition.

4. The method of claim 1, further comprising joining data within the at least one sub-partition based on the relationship, wherein the joined data comprises data belonging to the first data set and the second data set.

5. The method of claim 4, further comprising selecting a subset of the joined data.

6. The method of claim 1, further comprising selecting a subset of data belonging to the first data set and a subset of data belonging to the second data set based on the relationship.

7. The method of claim 1, further comprising:
   partitioning the second data set into one or more sub-partitions;
   specifying a second relationship between data within at least one of the sub-partitions of the second data set and data within the first data set; and
   replicating data within the first data set that relate to data within the at least one sub-partition of the second data set based on the second relationship to the at least one sub-partition of the second data set.

8. The method of claim 7, further comprising copying new or updated data within the first data set that relate to data within the at least one sub-partition of the second data set based on the second relationship to the at least one sub-partition of the second data set.

9. The method of claim 7, further comprising storing the second relationship in the at least one sub-partition of the second data set.

10. The method of claim 7, further comprising joining data within the at least one sub-partition of the second data set based on the second relationship, wherein the joined data comprises data belonging to the first data set and the second data set.

11. The method of claim 10, further comprising selecting a subset of the joined data.

12. The method of claim 7, further comprising selecting a subset of data belonging to the first data set and a subset of data belonging to the second data set based on the second relationship.

13. A system for creating a website comprising:
   a web server;
   a database server; and
   a plurality of data partitions comprising a first data set and a second data set, wherein the system is adapted to:
      partition the first data set into one or more sub-partitions, wherein the first data set comprises biographical information relating to users;
      specify a relationship between data within at least one of the sub-partitions and data within the second data set, wherein the second data set comprises website content for a plurality of websites and wherein the relationship identifies at least one user who is a member of at least one of the plurality of web sites; and
      replicate at least a portion of data within the second data set that relate to data within the at least one sub-partition based on the relationship to the at least one sub-partition.

14. The system of claim 13, wherein the system is further adapted to store the relationship in the at least one sub-partition.

15. The system of claim 13, wherein the system is further adapted to join data within the at least one sub-partition based on the relationship, wherein the joined data comprises data belonging to the first data set and the second data set.

16. The system of claim 13, wherein the system is further adapted to:
   partition the second data set into one or more sub-partitions;
   specify a second relationship between data within at least one of the sub-partitions of the second data set and data within the first data set; and
   replicate data within the first data set that relate to data within the at least one sub-partition of the second data set based on the second relationship to the at least one sub-partition of the second data set.

17. The system of claim 16, wherein the system is further adapted to store the second relationship in the at least one sub-partition of the second data set.

18. The system of claim 16, wherein the system is further adapted to join data within the at least one sub-partition of the second data set based on the second relationship, wherein the joined data comprises data belonging to the first data set and the second data set.

* * * * *